(12) United States Patent
Chen et al.

(10) Patent No.: US 8,311,365 B2
(45) Date of Patent: Nov. 13, 2012

(54) ANALYSIS METHOD FOR REGIONAL IMAGE

(75) Inventors: Yen-Chu Chen, Guishan Shiang (TW); Kuo-Tung Kao, Guishan Shiang (TW); Hong-Yu Zhu, Guishan Shiang (TW); Chi-Bin Wu, Guishan Shiang (TW)

(73) Assignee: Accumis, Inc., Taipei (TW)

( * ) Notice: Subject to any disclaimer, the term of this patent is extended or adjusted under 35 U.S.C. 154(b) by 495 days.

(21) Appl. No.: 12/562,159

(22) Filed: Sep. 18, 2009

(65) Prior Publication Data

US 2011/0026802 A1    Feb. 3, 2011

(30) Foreign Application Priority Data

Jul. 30, 2009   (TW) ............................... 98125642 A

(51) Int. Cl.
*G06K 9/00* (2006.01)
*G06K 9/20* (2006.01)
*H05G 1/28* (2006.01)
*G01D 18/00* (2006.01)

(52) U.S. Cl. ........ 382/287; 382/131; 382/151; 382/154; 378/163; 378/207

(58) Field of Classification Search .................. None
See application file for complete search history.

(56) References Cited

U.S. PATENT DOCUMENTS

| | | | | |
|---|---|---|---|---|
| 4,225,850 | A * | 9/1980 | Chang et al. | 382/124 |
| 6,044,132 | A * | 3/2000 | Navab | 378/163 |
| 7,570,791 | B2 * | 8/2009 | Frank et al. | 382/132 |
| 2003/0142883 | A1 * | 7/2003 | Ishii | 382/284 |
| 2004/0125996 | A1 * | 7/2004 | Eddowes et al. | 382/128 |
| 2008/0089611 | A1 * | 4/2008 | McFadyen et al. | 382/289 |
| 2009/0245599 | A1 * | 10/2009 | Weir | 382/128 |

OTHER PUBLICATIONS

Cho, Geometric calibration of a cone-beam computed tomography system and medical linear accelerator, 2004, ICCR 2004, pp. 1-5.*

* cited by examiner

*Primary Examiner* — Andrew W Johns
*Assistant Examiner* — David F Dunphy
(74) *Attorney, Agent, or Firm* — Stites & Harbison, PLLC; Juan Carlos A. Marquez, Esq

(57) ABSTRACT

An analysis method for a regional image is disclosed for an image datum from a C-arm device. The analysis method includes: providing an indication module, reading the image datum, selecting a plurality of ROIs (Regions of Interest), calculating an average brightness of each of the ROIs, searching every of the steel ball image data, comparing each of the steel ball image data and analyzing each of the steel ball image data. By individually analyzing the regional image datum, the brighter or darker image signal can be excluded so that it can improve precision during searching the steel ball image data. Moreover, it is also more effective for comparing an image profile of the steel ball image datum with a real profile of the steel ball of the indication module. Thus, the steel ball image can be readily defined by its correspondence with the steel ball of the indication module.

5 Claims, 5 Drawing Sheets

ANALYSIS METHOD FOR REGIONAL IMAGE

BACKGROUND OF THE INVENTION

1. Technical Field

The present invention relates to an analysis method for a regional image, and more particularly, to an analysis method for a regional image applied to analysis of an image datum captured by a C-arm device.

2. Description of Related Art

In orthopedics surgery, for precisely locating the nidi, plural medical images are usually acquired prior to the surgery whereby orthopedists can diagnose the bone status and determine the surgery is for the purposes of repair and fixation or for replacing artificial implants, such as artificial joints.

In the case that bone repair involves implanting artificial implants, success of the surgery hinges on the locational precision of the artificial implants in human bodies. Since the repaired bones are intended to perform basic movements, any inaccuracy of the arrangement of the artificial implants can pose the patients in the risk of dislocation, increased joint abrasion, and even leg-length discrepancy.

Therefore, during the surgery, orthopedists have to repeatedly take the X-ray images of the nidi for confirming the locational precision of the artificial implants. However, while a large number of such X-ray images are acquired, the health of the present medical staff can be adversely affected by the radioactive rays coming along with X-ray photography.

By comparison, a surgical navigation system facilitates remedying the problem of taking a large number of X-ray images during surgery. Such a system acquires required images prior to the surgery so as to enable preplanning of the surgical path for the surgical instruments. Thereby, not only can the surgery be simplified and the medical staff be protected against the long-term radioactive-ray exposure, but also the accuracy of the surgery can be improved.

In order to achieve the highly strict requirement of pre-surgery planning accuracy, in addition to the high quality, clear images acquired prior to surgery, another critical point is how to define the correct related locations with the images. For this end, a C-arm device, which benefits for its high mobility and ability of rotation, is popular for taking X-ray images in orthopedics surgery. Such a C-arm device, in taking X-ray images, has to be used with a calibration device, which shows its steel ball image data in the images for facilitating accurately defining object locality in the images. However, images captured by the C-arm device tend to contain brighter or darker image signals that hinder optimization of the gray scale values throughout images, rendering each said steel ball image datum unrecognizable in the image data during a global analysis, and in turn causing the object locality in the pre-surgery images undeterminable.

BRIEF SUMMARY OF THE INVENTION

The present invention relates to an analysis method for a regional image, wherein an image datum is divided into a plurality of ROIs (Regions of Interest), and gray scale values are adjusted according to an average brightness of each said ROI, so as to avoid uneven brightness throughout the image datum in a global analysis and in turn achieve accurate analysis of steel ball image data.

The present invention relates to an analysis method for a regional image, wherein each steel ball image datum can be identified, so objects in the image captured by a C-arm device can be accurately located. When applied to a surgical navigation system, this analysis method effectively reduces surgical complexity.

To achieve the above effects, the present invention provides an analysis method for a regional image, applied to a C-arm device, for analyzing an image datum captured by the C-arm device. The analysis method includes the following steps: providing an indication module, wherein the indication module includes a plurality of steel balls arranged therein, each said steel ball having a known template coordinate and having a real profile; reading the image datum, which has plural steel ball image data each corresponding to each said steel ball; selecting a plurality of ROIs (Regions of Interest) from the image datum, wherein centers of the ROIs are selected from the template coordinates, and each said ROI includes at least one said steel ball image datum; calculating an average brightness of each said ROI, and adjusting gray scale values in each said ROI according to the average brightness; searching each said steel ball image datum, by searching an image profile of each said steel ball image datum in a said ROI; comparing each said steel ball image datum, by comparing each said real profile with the corresponding image profile and defining a center of the most similar image profile as an image coordinate; and analyzing each said steel ball image datum, by calculating a locational difference between the template coordinate and the image coordinate and determining whether each said steel ball image datum corresponds to each said steel ball according to the locational difference.

Implementation of the present invention at least involves the following inventive steps:

1. By replacing the global analysis with the regional analysis in analyzing images, inaccurate analytic results caused by uneven image brightness can be eliminated.

2. By identifying the steel ball image datum in each said ROI with the regional analysis of the image datum, the object locality in the image datum can be determined with improved accuracy.

3. Since the object locality in the image datum can be defined with improved clearness and correctness, the precision of pre-surgery planning can be enhanced, thereby reducing the complexity of the surgery.

BRIEF DESCRIPTION OF THE SEVERAL VIEWS OF THE DRAWINGS

A detailed description of further features and advantages of the present invention is given below, with a view to enabling a person skilled in the art to understand and implement the technical contents disclosed herein and to readily comprehend the objectives and advantages of the present invention by reviewing the following description and the appended claims in conjunction with the accompanying drawings, in which:

DETAILED DESCRIPTION OF THE INVENTION

Figure 1:
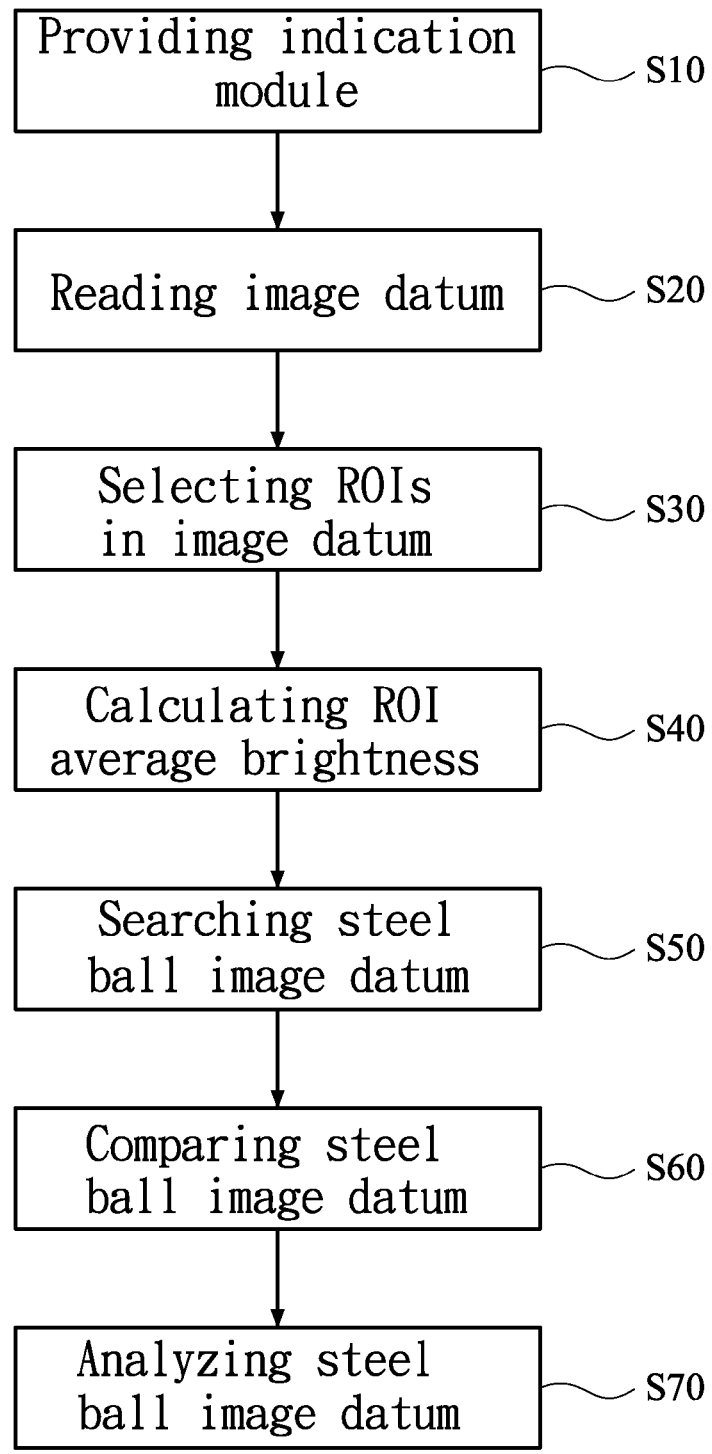
FIG. 1 is a flow chart of an analysis method for a regional image according to the present invention.

As shown in FIG. 1, the present invention discloses an analysis method for a regional image S100, applied to a C-arm device, for analyzing an image datum captured by the C-arm device. The analysis method S100 includes the following steps: providing an indication module S10; reading the image datum S20; selecting a plurality of ROIs (Regions of Interest) from the image datum S30; calculating an average brightness of each said ROI S40; searching every steel ball image datum S50; comparing each said steel ball image datum S60; and analyzing each said steel ball image datum S70.

Figure 2:
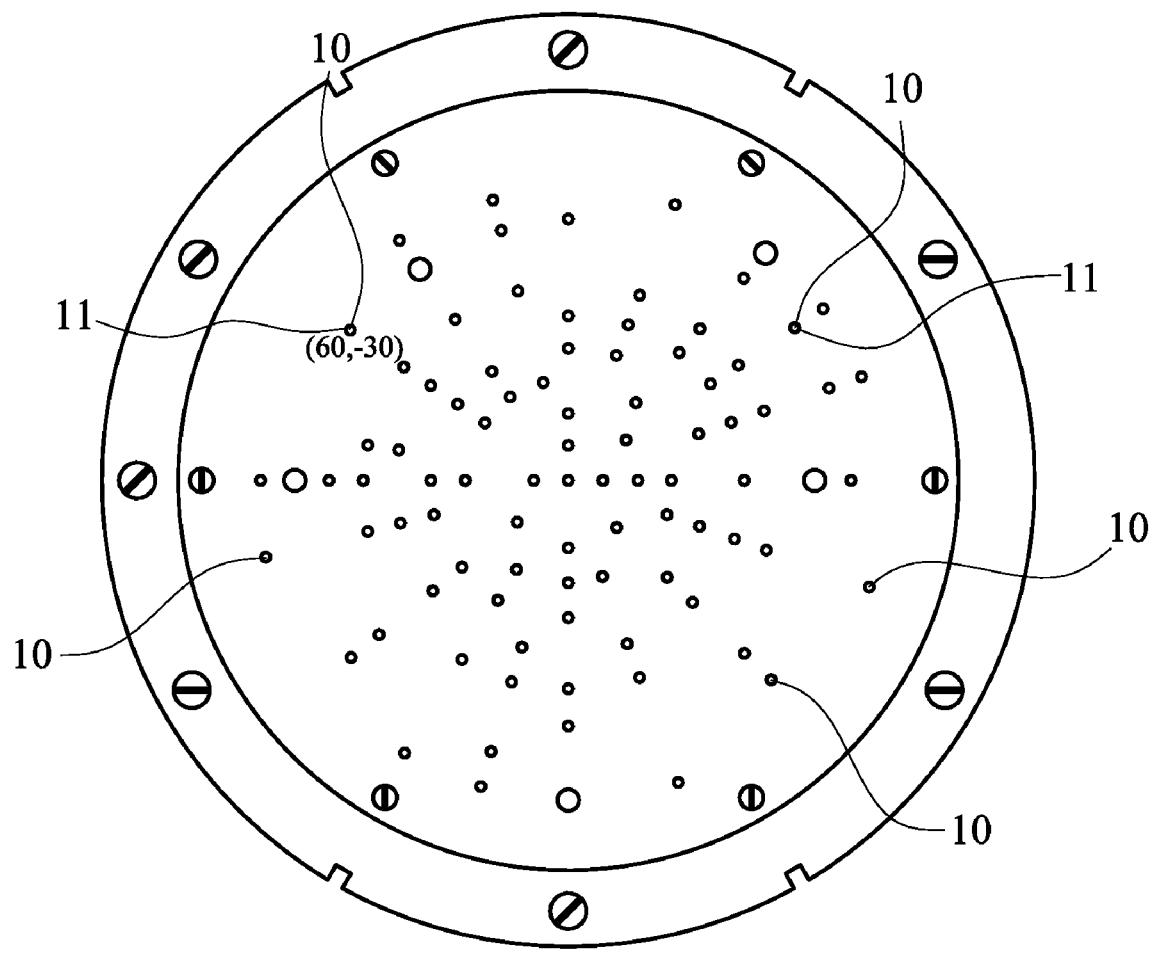
FIG. 2 is a schematic drawing showing an indication module according to the present invention.

In the step of providing an indication module S10, as shown in FIG. 2, the indication module 100 may have a plurality of steel balls 10 arranged in a radial pattern. Each said steel ball 10 may have a diameter of 3 mm, and has a template coordinate, namely the real coordinate of the steel ball 10 in the indication module 100. Furthermore, the template coordinate of each said steel ball 10 is known and each said steel ball 10 also has a real profile 11, namely the real profile 11 defined by the rim of the steel ball.

Figure 3:
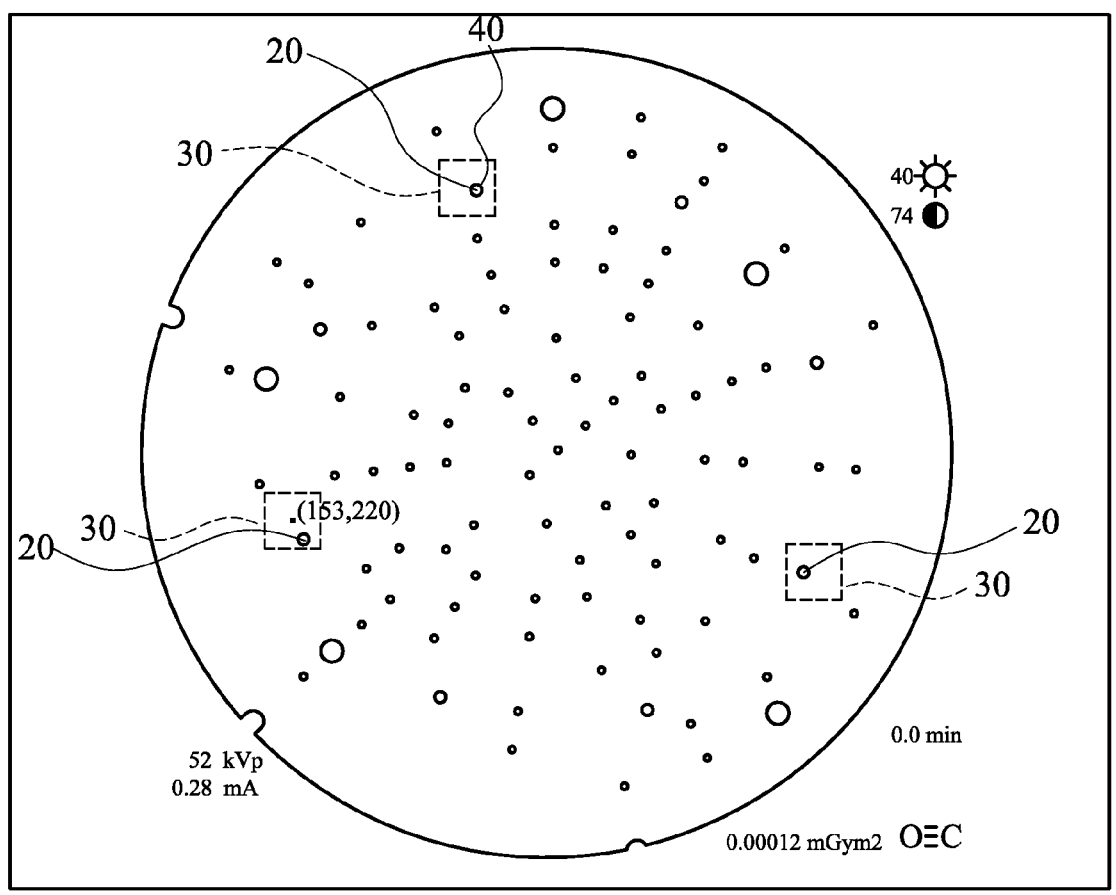
FIG. 3 is a diagram showing an image datum according to the present invention.

In the step of reading the image datum S20, the image datum 200 (as shown in FIG. 3) captured by the C-arm device is read. When the C-arm device captures images, the indication module 100 is placed in front of the image detector of the C-arm device, so each said steel ball 10 in the indication module 100 corresponds to a steel ball image datum 20, while each said steel ball image datum 20 is included in the image datum 200, so that the image datum 200 includes plural said steel ball image data 20. In other words, each said steel ball image datum 20 corresponds to a said steel ball 10 in the indication module 100.

In the step of selecting a plurality of ROIs from the image datum S30, referring to FIG. 3, since the image datum 200 includes plural said steel ball image data 20, the plural ROIs 30 can be selected according to the locations of the steel ball image data 20 in the image datum 200. In other words, centers of the ROIs 30 are selected from the template coordinates of the steel balls 10. The selected template coordinates are transformed so as to get coordinate values of the template coordinates reflected in the image datum 200. Thus the transformed coordinate values can be taken as the centers of the ROIs 30. Therein, the selected ROIs 30 must contain at least one said steel ball image datum 20.

Figure 4:
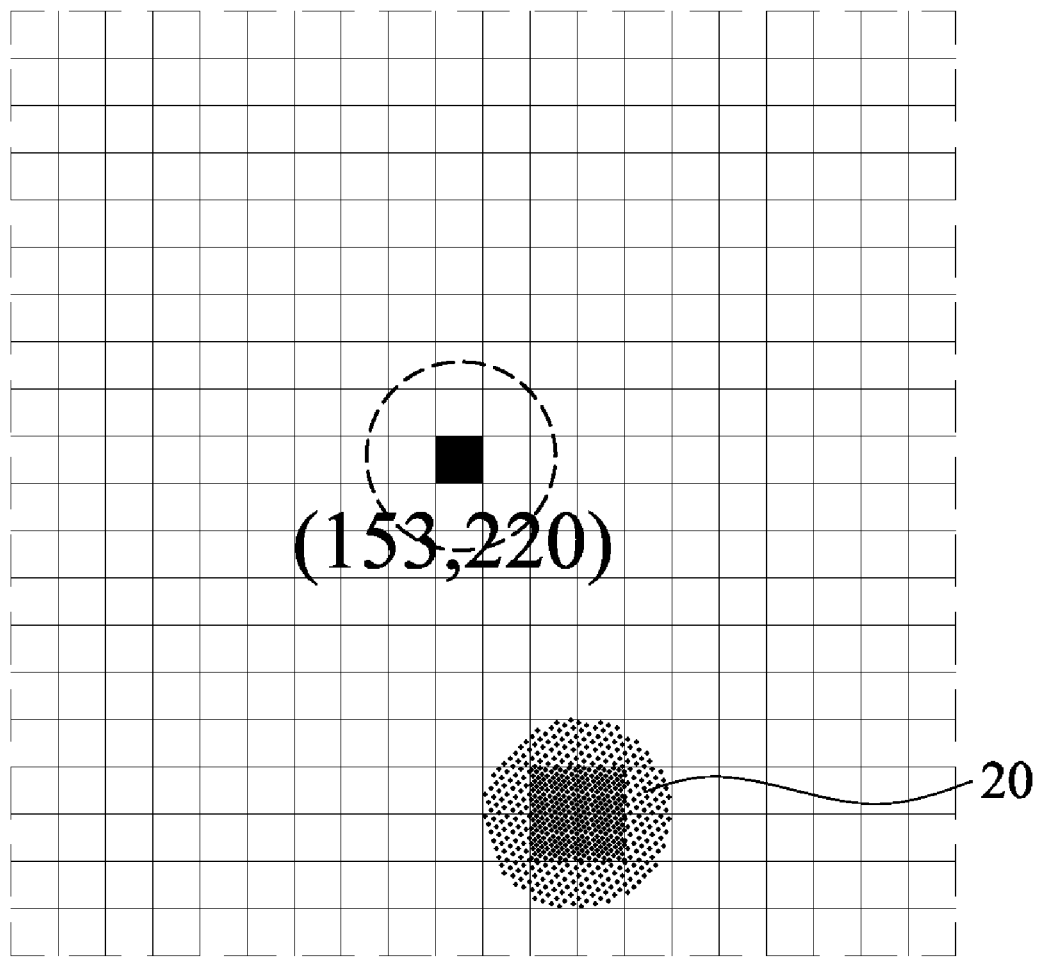
FIGS. 4 and 5 are diagrams showing a ROI (Region of Interest) according to the present invention.

For example, referring to FIG. 3, since the template coordinates of all the steel balls 10 are known, any of the template coordinates, e.g. (60,−30), can be selected and the coordinate value (153,220) of the template reflected in the image datum 200 can be derived. The derived coordinate value is then taken as a center for selecting the ROI 30 so that each said ROI 30 contains at least one steel ball image datum 20. As shown in FIG. 4, the ROI 30 may be sized as 20×20 pixels, or may be sized anyway as need without limitation.

The step of calculating the average brightness of each said ROI S40 is herein discussed. Since the ROI 30 may contain the steel ball image data 20 with different sizes of image signals, the steel ball image data 20 may be brighter or darker. Thus, after the ROIs 30 are selected, the average brightness of the ROI 30 can be calculated and the gray scale values of the ROI 30 can be adjusted according to the average brightness so as to ensure each said steel ball image datum 20 in each said ROI 30 can be presented clearly.

In the step of searching every steel ball image data S50, as shown in FIG. 4, since the ROI 30 is selected by taking the coordinate value of (153,220) as the center, a reference circle may be drawn by taking the coordinate value of (153,220) as its center, and any image signal similar to the reference circle are searched in the ROI 30.

Figure 5:
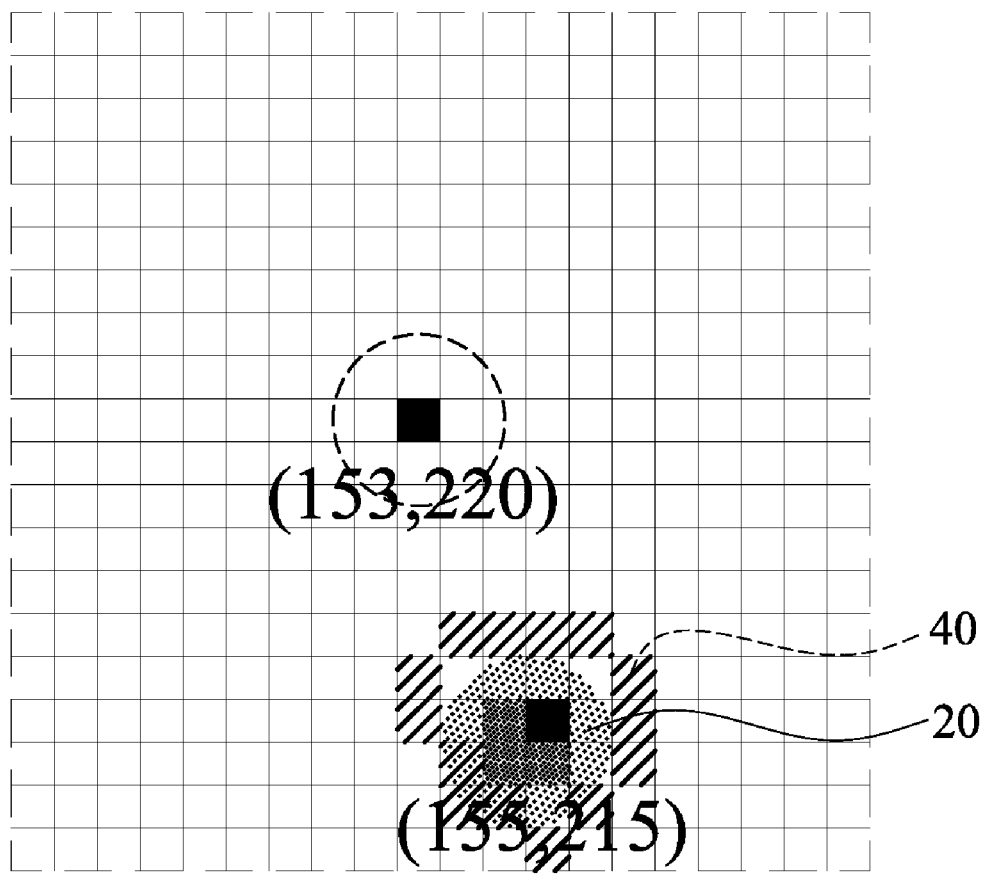

Referring to FIG. 5, since each said ROI 30 contains at least one said steel ball image datum 20, by using the reference circle, an image profile 40 of every steel ball image datum 20, namely the image profile 40 defined by the rim of the steel ball image datum 20, can be searched in the ROI 30. Moreover, every steel ball image datum 20 can be processed by a canny filter so as to enhance the image profile 40, thereby improving the accuracy of the search.

In the step of comparing each said steel ball image data S60, the real profile 11 of every steel ball 10 is compared with the image profile 40 of every steel ball image data 20 so as to define the center of the image profile 40 most similar to the real profile 11 as an image coordinate, such as (155,215), namely the coordinate of the steel ball image datum 20.

In the step of analyzing each steel ball image datum S70, since the template coordinate represents the real coordinate of the steel ball 10, and the image coordinate represents the coordinate of the steel ball image datum 20, whether each steel ball image datum 20 is corresponding to one said steel ball 10 can be determined by calculating a locational difference between the template coordinate and the image coordinate.

For example, in a case where it is preset that a locational difference smaller than 6 means one said steel ball image datum 20 corresponding to one said steel ball 10, when the template coordinate of (0,70) reflected in the image datum 200 as (153,220), and the image coordinate searched from the image datum 200 is (155,215), the distance between the template coordinate and the image coordinate is 5.38, so it indicates that the steel ball image datum 20 corresponds to the steel ball 10, so that the coordinate of the steel ball image datum 20 can be correctly defined.

By using the analysis method for a regional image S100, every steel ball image datum 20 in an image datum 200 can be defined, so as to correctly determine object locality in the image datum 200. Thus, the analysis method is applicable to a surgical navigation system for improving the precision of pre-surgery planning and reducing surgical complexity.

The foregoing embodiment is illustrative of the characteristics of the present invention so as to enable a person skilled in the art to understand the disclosed subject matter and implement the present invention accordingly. The embodiment, however, is not intended to restrict the scope of the present invention. Hence, all equivalent modifications and variations made in the foregoing embodiment without departing from the spirit and principle of the present invention should fall within the scope of the appended claims.

What is claimed is:

1. An analysis method for a regional image, applied to a C-arm device, for analyzing an image datum captured by the C-arm device, the analysis method comprising steps of:
   providing an indication module, wherein the indication module includes a plurality of steel balls, each said steel ball having a known template coordinate and having a real profile;
   reading the image datum, which includes plural steel ball image data each corresponding to one said steel ball;
   selecting a plurality of ROIs (Regions of Interest) in the image datum, wherein centers of the plural ROIs are selected from the template coordinates, and each said ROI includes at least one said steel ball image datum;
   calculating an average brightness of each said ROI, and adjusting gray scale values in the ROI according to the average brightness;
   searching each said steel ball image datum, by searching an image profile of the steel ball image datum in the ROI;
   comparing each said steel ball image datum, by comparing each said real profile with each said image profile and defining a center of the most similar image profile as an image coordinate; and analyzing each said steel ball image datum, by calculating a locational difference between the template coordinate and the image coordinate and determining whether the steel ball image datum corresponds to one said steel ball according to the locational difference, and defining the coordinate of each the steel ball image datum in response to said analyzing.

2. The analysis method of claim 1, wherein the indication module has the steel balls arranged in a radial pattern.

3. The analysis method of claim 1, wherein each said steel ball has a diameter of 3 mm.

4. The analysis method of claim 1, wherein each said steel ball image datum is processed by a canny filter for enhancing the image profile.

5. The analysis method of claim 1, wherein each said ROI (Region of Interest) is of 20×20 pixels.

* * * * *